(12) United States Patent
Ikari et al.

(10) Patent No.: US 9,071,720 B2
(45) Date of Patent: Jun. 30, 2015

(54) IMAGE READING APPARATUS AND SHEET PROCESSING APPARATUS

(71) Applicant: Kabushiki Kaisha Toshiba, Tokyo (JP)

(72) Inventors: Seiji Ikari, Kanagawa-ken (JP); Junji Miura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/019,205

(22) Filed: Sep. 5, 2013

(65) Prior Publication Data

US 2014/0063567 A1    Mar. 6, 2014

(30) Foreign Application Priority Data

Sep. 6, 2012    (JP) .................. 2012-196535

(51) Int. Cl.
| H04N 1/04 | (2006.01) |
| H04N 1/40 | (2006.01) |
| H04N 1/028 | (2006.01) |
| G07D 7/12 | (2006.01) |
| G07D 7/16 | (2006.01) |
| G07D 7/20 | (2006.01) |

(52) U.S. Cl.
CPC ............. *H04N 1/02815* (2013.01); *G07D 7/12* (2013.01); *G07D 7/168* (2013.01); *G07D 7/2008* (2013.01)

(58) Field of Classification Search
CPC .............. H04N 1/00681; H04N 1/193; H04N 1/00748; H04N 1/00737; H04N 1/1017
USPC ......... 358/488, 486, 461, 465, 464, 496, 474, 358/475, 505, 509; 382/151, 137, 274, 275, 382/286, 289, 291
See application file for complete search history.

(56) References Cited

U.S. PATENT DOCUMENTS

| 4,587,434 A | 5/1986 | Roes et al. |
| 5,764,380 A | 6/1998 | Noguchi |
| 8,159,728 B2 | 4/2012 | Miura et al. |
| 2011/0031386 A1 | 2/2011 | Pradel |

FOREIGN PATENT DOCUMENTS

| EP | 0629926 A2 | 12/1994 |
| EP | 1128338 A1 | 8/2001 |

OTHER PUBLICATIONS

Extended European Search Report issued in corresponding European Patent Application No. 13182795.8, mailed on Dec. 20, 2013; 3 pages.

*Primary Examiner* — Cheukfan Lee
(74) *Attorney, Agent, or Firm* — Baker Botts L.L.P.

(57) ABSTRACT

According to one embodiment, an image reading apparatus includes an illumination unit to irradiate a sheet that is conveyed by a conveyance unit with visible light and infrared light, an imaging unit to receive visible light and infrared light reflected from the sheet and to capture a visible image and an infrared image, and a background member including an infrared light low reflective part that is positioned within an imaging range of the imaging unit so as to overlap at least a side edge portion of the sheet and that diffusely reflects visible light and reflects infrared light at a lower reflectance than the sheet.

6 Claims, 5 Drawing Sheets is a block diagram for explaining a sheet processing apparatus according to one embodiment, FIG. 7 is a block diagram for explaining an image reading apparatus according to one embodiment.

IMAGE READING APPARATUS AND SHEET PROCESSING APPARATUS

CROSS-REFERENCE TO RELATED APPLICATION

This application is based upon and claims the benefit of priority from Japanese Patent Application No. 2012-196535, filed on Sep. 6, 2012; the entire contents of which are incorporated herein by reference.

FIELD

Embodiments described herein relate generally to an image reading apparatus and a sheet processing apparatus.

BACKGROUND

Conventionally, sheet processing apparatuses that perform various types of inspections of sheets have been put to practical use. A sheet processing apparatus has an image reading apparatus that reads an image of a sheet. The sheet processing apparatus takes in sheets that are placed in a feed unit in such a manner that one sheet is taken in at a time, and conveys the sheets to the image reading apparatus. The sheets that are processed by the sheet processing apparatus may be banknotes, bills, or securities etc.

The image reading apparatus includes an illuminator and a sensor. The image reading apparatus irradiates a conveyed sheet with light, and the sensor detects optical features (characteristics) of that sheet from reflected light. The sheet processing apparatus identifies the sheet by comparing various preset parameters with the detected characteristics. Moreover, the image reading apparatus includes a background plate that has a reference color part (e.g., white part) for stably reading an image from a sheet. The image reading apparatus corrects the image in accordance with light from the reference color part.

In cases where a sheet is conveyed at a high speed, the sheet may be skewed or slid. Thus, the image reading apparatus detects an edge of the sheet during conveyance, detects skewing and sliding of the sheet from the detected edge, and corrects an image of the sheet based on the detected skewing and sliding.

In order to detect an edge of a sheet, the background plate of the image reading apparatus has a region in which a black region is disposed so as to prevent reflected light from entering the sensor. However, if a black region is disposed in the background plate, there is a problem in that the image of the sheet may be affected.

DETAILED DESCRIPTION

According to one embodiment, there is provided an image reading apparatus including an illumination unit to irradiate a sheet that is conveyed by a conveyance unit with visible light and infrared light, an imaging unit to receive visible light and infrared light reflected from the sheet and to capture a visible image and an infrared image, and a background member including an infrared light low reflective part that is positioned within an imaging range of the imaging unit so as to overlap at least a side edge portion of the sheet and that diffusely reflects visible light and reflects infrared light at a lower reflectance than the sheet.

Referring to the accompanying drawings, the following is a detailed description of an image reading apparatus and a sheet processing apparatus according to one embodiment.

Figure 1:
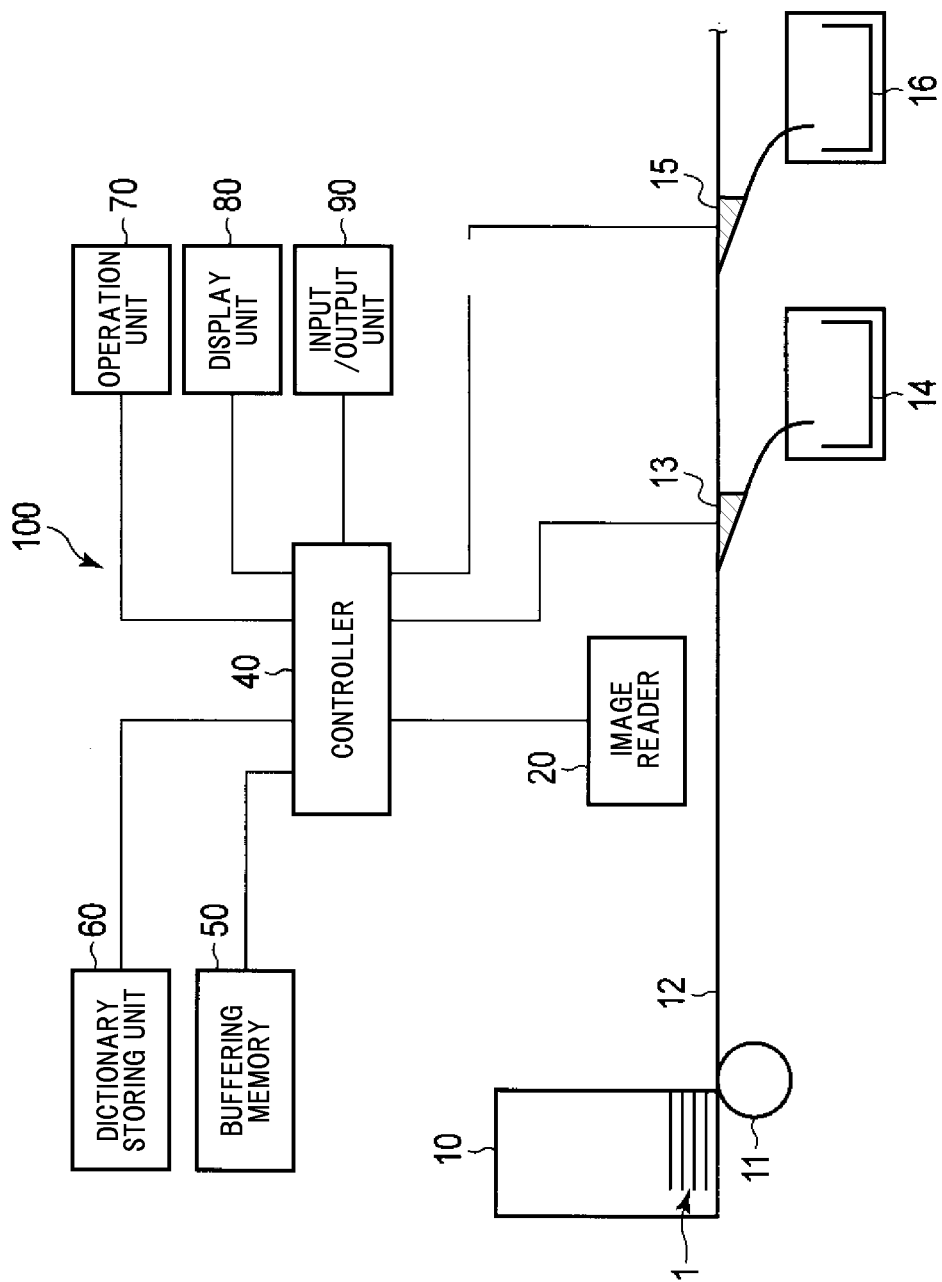
FIG. 1 is a block diagram for explaining a sheet processing apparatus according to one embodiment.

FIG. 1 shows an example of the configuration of a sheet processing apparatus 100 according to one embodiment. The sheet processing apparatus 100 can determine the category, such as the denomination and generation, of a sheet 1, the authenticity of the sheet 1, the fitness of the sheet 1, and the like based on the result of detection by an image reading apparatus.

The sheet processing apparatus 100 includes a supply unit 10, a separation roller 11, a conveyor 12, a first gate 13, a first stacker 14, a second gate 15, a second stacker 16, an image reader 20, a controller 40, a buffering memory 50, a dictionary storing unit 60, an operation unit 70, a display unit 80, and an input/output unit 90. Moreover, the sheet processing apparatus 100 includes a cutting unit, which is not shown, downstream of the second gate 15.

The controller 40 performs integrated control of the operations of the various units of the sheet processing apparatus 100. The controller 40 includes a CPU, a random-access memory, a program memory, a nonvolatile memory, and the like. The CPU performs various types of arithmetic processing. The random-access memory temporarily stores the results of arithmetic operations performed by the CPU. The program memory and the nonvolatile memory store various programs to be executed by the CPU, control data, and the like. The controller 40 is capable of performing various types of processing by the CPU executing the programs stored in the program memory.

The supply unit 10 stocks sheets 1 to be fed into the sheet processing apparatus 100. The supply unit 10 collectively receives the sheets 1 in a state in which the sheets are laid one on top of another.

The separation roller 11 is provided at a lower end of the supply unit 10. In the case where the sheets 1 are placed in the supply unit 10, the separation roller 11 comes into contact with the lowest sheet of the placed sheets 1 in a stacking direction. Rotation of the separation roller 11 causes the sheets 1 that are put in the supply unit 10 to be fed into the inside of the sheet processing apparatus 100 on a sheet-by-sheet basis in an ascending order from the lowest sheet to the highest sheet with respect to the stacking direction.

For example, each time the separation roller 11 makes one rotation, one sheet 1 is fed. Thus, the sheets 1 are fed at a constant pitch by the separation roller 11. The sheets 1 that have been fed by the separation roller 11 are introduced into the conveyor 12.

The conveyor 12 is a conveyance unit that conveys the sheets 1 to the various units within the sheet processing apparatus 100. The conveyor 12 includes a conveyor belt, which is not shown, a drive pulley, which is not shown, and the like. In the conveyor 12, the drive pulley is driven by a drive motor, which is not shown. The conveyor belt is operated by the drive pulley.

The conveyor 12 conveys the sheets 1, which have been fed by the separation roller 11, on the conveyor belt at a constant speed. It should be noted that the side of the conveyor 12 that is close to the separation roller 11 will be described as "upstream side", and the side that is opposite to the upstream side will be described as "downstream side".

The image reader 20 acquires an image from a sheet 1 that is conveyed by the conveyor 12. The image reader 20 includes, for example, a camera, an illuminator, a background plate, an image acquiring unit, an image processing unit, and a controller. The camera and the illumination unit are positioned on the other side of the conveyor 12 from the background plate so as to face the background plate. The camera includes, for example, a line image sensor, such as a Charge Coupled Device (CCD) or a CMOS, and a lens that images light onto the sensor. The lens receives reflected light from the sheet 1 and reflected light from the background plate and images the reflected light onto the sensor. The sensor generates an electric signal in response to the light that has been imaged thereon, and acquires an image. In this manner, the image reader 20 reads an image of the sheet 1 that is conveyed by the conveyor 12.

Furthermore, the image reader 20 calculates characteristics from the acquired image. The image reader 20 supplies the calculated characteristics and the image to the controller 40.

The controller 40 determines the authenticity of the sheet 1 based on the supplied characteristics. That is to say, the controller 40 determines whether the sheet 1 is genuine or counterfeit.

Also, the controller 40 determines the category, such as the denomination and generation, of the sheet 1 based on the supplied characteristics.

Furthermore, the controller 40 determines the fitness of the sheet 1 based on the supplied characteristics. That is to say, the controller 40 determines whether the sheet 1 is a fit sheet that is fit for recirculation or an unfit sheet that is unfit for recirculation.

The first gate 13 and the second gate 15 are provided downstream from the image reader 20 along the conveyor 12. The first gate 13 and the second gate 15 are each operated based on control of the controller 40. The controller 40 controls the first gate 13 and the second gate 15 in accordance with the various determination results with respect to the sheet 1.

The first gate 13 switches the destination of the sheet 1 between the first stacker 14 and the second gate 15. The second gate 15 switches the destination of the sheet 1 between the second stacker 16 and the cutting unit.

The controller 40 controls the first gate 13 and the second gate 15 so that any sheet 1 that has been determined to be a fit sheet is conveyed to the first stacker 14 or the second stacker 16. That is to say, the controller 40 controls the various units so that fit sheets are sorted by denomination and stacked.

Also, the controller 40 controls the first gate 13 and the second gate 15 so that any sheet 1 that has been determined to be an unfit sheet is conveyed to the cutting unit that is provided downstream of the second gate 15. The first gate 13 and the second gate 15 function as sorting processors. That is to say, the controller 40 controls the various units so that any sheet 1 that has been determined to be an unfit sheet is conveyed to the cutting unit and cut by the cutting unit.

The buffering memory 50 stores various processing results. For example, the buffering memory 50 stores an image acquired by the image reader 20. Moreover, the buffering memory 50 stores characteristics and the like calculated from the image. It should be noted that the random-access memory or the nonvolatile memory included in the controller 40 may be substituted for the buffering memory 50.

The dictionary storing unit 60 stores various parameters that are used in the above-described identification processing. The dictionary storing unit 60, for example, stores parameters for each category of sheets in advance. The controller 40 performs the identification processing based on the parameters stored in the dictionary storing unit 60 and the above-described characteristics. Thus, the controller 40, which serves as an identification unit, can determine the category, authenticity, fitness, and the like of the sheet.

The operation unit 70 accepts various operation inputs by an operator. The operation unit 70 generates an operation signal based on an operation input by the operator, and transmits the generated operation signal to the controller 40. The display unit 80 displays various types of screens based on control of the controller 40. For example, the display unit 80 displays various types of operation guidance, processing results, and the like to the operator. It should be noted that the operation unit 70 and the display unit 80 may also be formed as a single member serving as a touch panel.

The input/output unit 90 exchanges data with an external device or a storage medium that is connected to the sheet processing apparatus 100. For example, the input/output unit 90 may include a disk drive, a USB connector, a LAN connector, or other interfaces that enable data exchange. The sheet processing apparatus 100 can acquire data from an external device or a storage medium that is connected to the input/output unit 90. Moreover, the sheet processing apparatus 100 can also transmit the processing result to an external device or a storage medium that is connected to the input/output unit 90.

Figure 2:
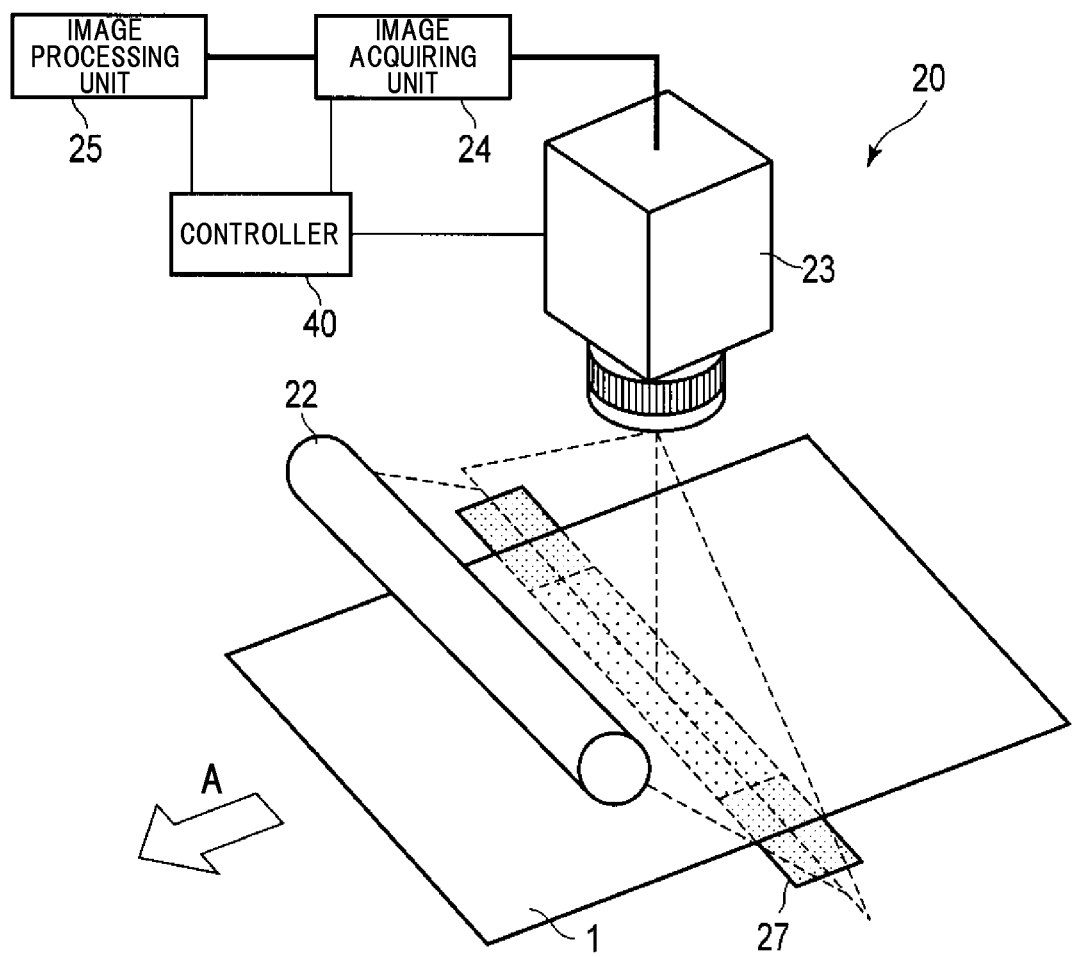
FIG. 2 is a perspective view including a partial block diagram for explaining an image reading apparatus according to one embodiment.

FIG. 2 shows an example of the image reader (image reading apparatus) 20. The image reader 20 includes an illuminator 22, a camera 23, an image acquiring unit 24, an image processing unit 25, and a background plate 27. The image reader 20 reads an image from a sheet 1 that is conveyed by the conveyor 12 in a direction of arrow A indicated in FIG. 2.

The illuminator 22 irradiates the sheet 1 that is being conveyed by the conveyor 12 with light. The illuminator 22 directs light at an irradiation range that is larger than at least the reading range of the camera 23. Moreover, the illuminator 22 is configured so as to be able to irradiate the sheet 1 with at least visible light and infrared light at the same time.

The illuminator 22 includes a light source and an optical system. The light source is a device that emits light. For example, the light source may include an LED, an organic EL, a cold-cathode tube, a halogen light source, a fluorescent lamp, or other light emitting devices, and a combination of these. The optical system collects and guides light radiated from the light source to the reading range of the camera 23.

In the case where a sheet 1 is present within the reading range of the camera 23, light from the illuminator 22 falls on the sheet 1. A part of the light falling on the sheet 1 is reflected by the surface of the sheet 1. Moreover, a part of the light falling on the sheet 1 passes through the sheet 1.

The camera 23 includes a photodiode array (line image sensor) in which photodiodes such as CCDs, CMOSes, or the like are arranged in a line, and an optical system such as, for example, a lens that images light onto the line image sensor. The line image sensor includes a plurality of imaging devices (pixels) that convert incident light into electric signals, or in other words, an image and that are arranged in a line.

The line image sensor accumulates electric charges in response to incident light. Also, the camera 23 outputs an analog voltage level corresponding to the electric charge accumulated in each pixel of the line image sensor to the image acquiring unit 24 at a predetermined timing.

It should be noted that the camera 23 has a function of imaging light that is coaxially incident thereon with a plurality of sensors. For this purpose, the camera 23 includes a plurality of line image sensors. In addition, the optical system can separate light that has entered on a single optical axis into its spectral components and image the separated light components onto the plurality of line image sensors. The configuration of the camera 23 will be described later.

The image acquiring unit 24 performs A/D conversion of an analog signal that is supplied from the camera 23, and furthermore performs a correction such as an AGC (Automatic Gain Control) correction. The image acquiring unit 24 is capable of performing A/D conversion and an AGC correction of analog signals successively supplied from the camera 23 and thereby acquiring an image.

Based on the image acquired by the image acquiring unit 24, the image processing unit 25 performs position detection (detection of the sliding amount) and skew detection (detection of the amount of skew) with respect to the sheet 1, correction of the image, and calculation of image characteristics. The image processing unit 25 sends the calculated characteristics to the controller 40.

The controller 40 determines the authenticity, denomination, fitness, and the like of the sheet 1 based on the supplied characteristics.

Figure 3:
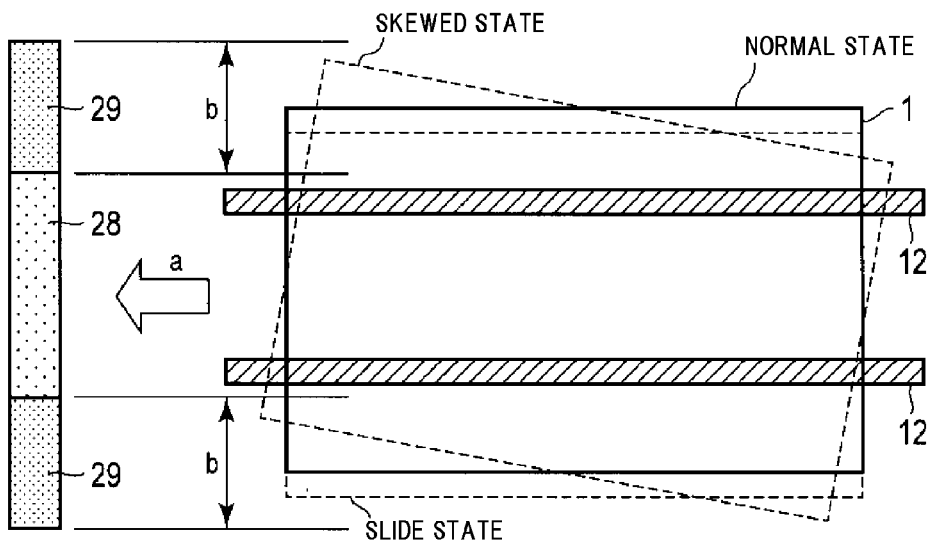
FIG. 3 is a plan view for explaining an image reading apparatus according to one embodiment.

As shown in FIGS. 2 and 3, the background plate (background member) 27 has an elongated rectangular shape. The background plate 27 is positioned so as to cover an imaging range of the camera 23, and extends beyond a conveyance area of the sheet 1 in a direction that is orthogonal to the conveyance direction A of the sheet 1. The background plate 27 has a surface that faces the sheet 1. The surface of the background plate 27 that faces the sheet 1 includes a light diffusing/reflecting part 28 that diffusely reflects light at a high reflectance and specific wavelength low reflective parts 29 having a low reflectance with respect to light in a specific wavelength region.

The light diffusing/reflecting part 28 functions as a white reference part and reflects light falling thereon from the illuminator 22 in various directions. The light diffusing/reflecting part 28 diffusely reflects light in a visible light wavelength region and light in an infrared light wavelength region, the light falling thereon from the illuminator 22.

The specific wavelength low reflective parts 29 absorb light in a specific wavelength region and diffusely reflect light in the other wavelength regions. The specific wavelength low reflective parts 29 diffusely reflect light in the visible light wavelength region falling thereon from the illuminator 22, and absorb light in the infrared light wavelength region so as not to reflect this light. The specific wavelength low reflective parts 29 are composed of a material that reflects infrared light at a lower reflectance than the sheet 1. That is to say, the specific wavelength low reflective parts 29 serve as an infrared light low reflective part that reflects infrared light at a lower reflectance than the sheet 1.

The specific wavelength low reflective parts 29 are provided in, for example, respective end portions of the background plate 27 in its longitudinal direction. Each of the specific wavelength low reflective parts 29 is positioned so as to overlap a corresponding side edge portion of the conveyed sheet 1. Moreover, the light diffusing/reflecting part 28 is provided in a region of the surface of the background plate 27 excluding the specific wavelength low reflective parts 29. That is to say, the specific wavelength low reflective parts 29 and the light diffusing/reflecting part 28 are provided side by side.

It should be noted that with regard to the sheet 1 that is conveyed to the imaging range of the camera 23, as shown in FIG. 3, besides a case where the sheet 1 is conveyed in a normal conveyance state in which the sheet 1 is not skewed, there are cases where the sheet 1 may be conveyed in a state in which the sheet 1 is displaced or skewed, that is, in a slid/skewed state (slanting conveyance state). For this reason, the specific wavelength low reflective parts 29 of the background plate 27 are provided so as to cover positions "b" that may overlap the corresponding side edge portions of the conveyed sheet 1.

Figure 4:
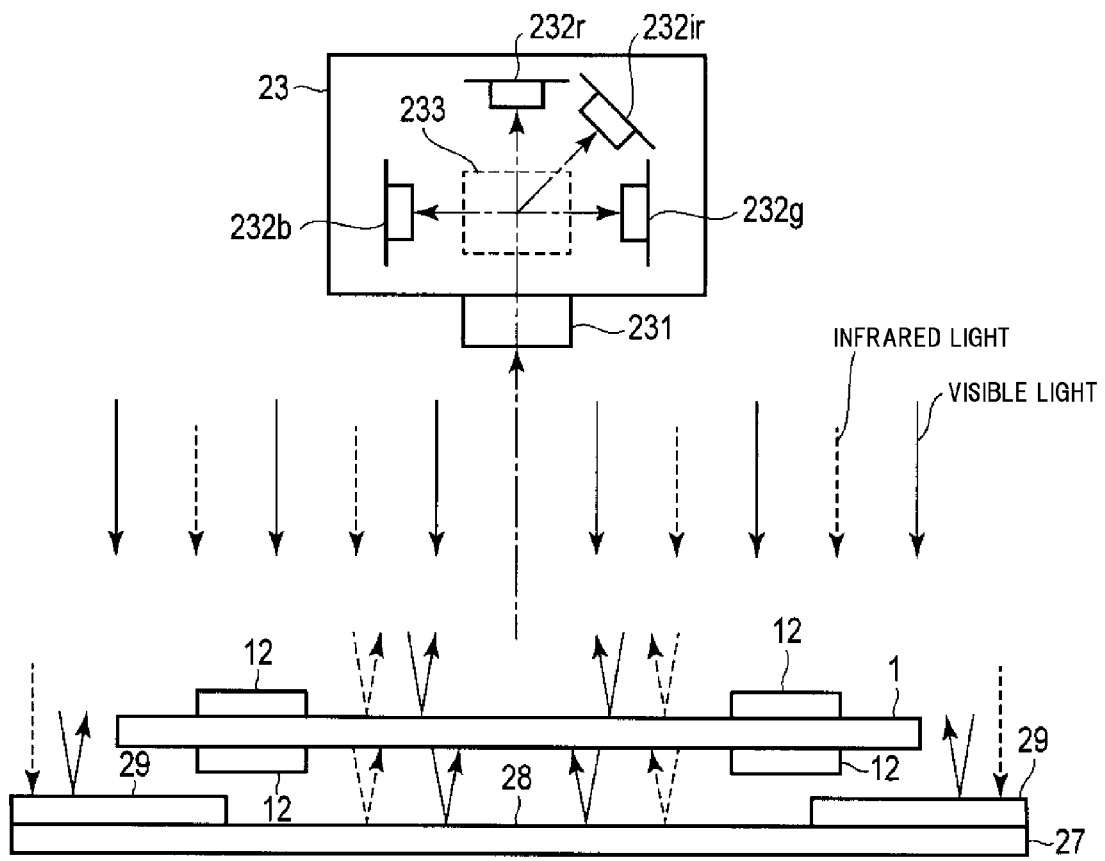
FIG. 4 is a schematic front view for explaining an image reading apparatus according to one embodiment.

As shown in FIG. 4, the specific wavelength low reflective parts 29 of the background plate 27 are formed by disposing a material that absorbs a specific wavelength on a side of the background plate 27 that faces the camera 23.

As described above, the illuminator 22 irradiates the sheet 1 and the background plate 27 with visible light and infrared light. If the sheet 1 is present in a reading position of the camera 23, a part of visible light and infrared light emitted from the illuminator 22 is diffusely reflected by the surface of the sheet 1.

Moreover, a part of the visible light and infrared light emitted from the illuminator 22 passes through the sheet 1 and falls on the background plate 27 at the rear of the sheet 1. If the visible light and infrared light passing through the sheet 1 falls on the light diffusing/reflecting part 28 of the background plate 27, the visible light and infrared light are diffusely reflected. Moreover, if the visible light passing through the sheet 1 falls on the specific wavelength low reflective parts 29 of the background plate 27, the visible light is diffusely reflected. Furthermore, if the infrared light passing through the sheet 1 falls on the specific wavelength low reflective parts 29 of the background plate 27, the infrared light is absorbed by the specific wavelength low reflective parts 29.

The camera 23 includes a lens 231, a plurality of sensors 232, and a spectral member 233. The lens 231 is an optical system that receives light and images the received light onto the sensors 232. The lens 231 receives light from a predetermined range and images the received light onto the sensors 232.

The camera 23 includes the plurality of line image sensors 232 that respectively detect, for example, red (R), green (G), blue (B) and infrared (IR) light components. That is to say, the camera 23 includes a line image sensor 232r that detects the red component and generates an R signal, a line image sensor 232g that detects the green component and generates a G signal, a line image sensor 232b that detects the blue component and generates a B signal, and a line image sensor 232ir that detects infrared light and generates an IR signal.

The spectral member 233 has a prism that separates light entering on a single optical axis into light components in four different wavelength regions, that is, red, green, blue, and infrared light components. The spectral member 233 separates the red component of light from the incident light and images the separated light component onto the line image sensor 232r. The spectral member 233 separates the green component of light from the incident light and images the separated light component onto the line image sensor 232g. The spectral member 233 separates the blue component of light from the incident light and images the separated light component onto the line image sensor 232b. The spectral member 233 separates the infrared light component from the incident light and images the separated light component onto the line image sensor 232*ir*. That is to say, the spectral member 233 separates light entering on the same optical axis into a plurality of light components having different wavelengths.

The camera 23 outputs the signals detected by the line image sensors 232*r*, 232*g*, and 232*b* to the image acquiring unit 24 as electric signals for a visible image. The image acquiring unit 24 can acquire the visible image based on the electric signals for the visible image.

Moreover, the camera 23 outputs the signal detected by the line image sensor 232*ir* to the image acquiring unit 24 as an electric signal for an infrared image (IR image). The image acquiring unit 24 can acquire the infrared image based on the electric signal for the infrared image.

If the sheet 1 is not present in the reading position of the camera 23, visible light and infrared light emitted from the illuminator 22 fall on the background plate 27. Visible light that falls on the specific wavelength low reflective parts 29 of the background plate 27 is diffusely reflected by the specific wavelength low reflective parts 29. Infrared light that falls on the specific wavelength low reflective parts 29 of the background plate 27 is absorbed by the specific wavelength low reflective parts 29.

That is to say, if the sheet 1 is present within the imaging range of the camera 23, visible light and infrared light diffusely reflected by the surface of the sheet 1 enter the lens 231 of the camera 23. Moreover, if the sheet 1 is present within the imaging range of the camera 23, visible light passing through the sheet 1 and reflected by the light diffusing/reflecting part 28 and the specific wavelength low reflective parts 29 of the background plate 27 enters the lens 231 of the camera 23.

On the other hand, if the sheet 1 is not present within the imaging range of the camera 23, visible light reflected by the light diffusing/reflecting part 28 and the specific wavelength low reflective parts 29 of the background plate 27 enters the lens 231 of the camera 23. Moreover, if the sheet 1 is not present within the imaging range of the camera 23, infrared light reflected by the light diffusing/reflecting part 28 of the background plate 27 enters the lens 231 of the camera 23.

That is to say, no infrared light is reflected from the specific wavelength low reflective parts 29 of the background plate 27. For this reason, if the sheet 1 is not present within the imaging range of the camera 23, no infrared light from the specific wavelength low reflective parts 29 enters the lens 231 of the camera 23. Thus, the specific wavelength low reflective parts 29 are black in the IR image that images infrared light. On the other hand, if the sheet 1 is present within the imaging range of the camera 23, infrared light reflected from the sheet 1 enters the lens 231 of the camera 23. Thus, the sheet 1 is white in the IR image that images infrared light.

Moreover, the specific wavelength low reflective parts 29 of the background plate 27 diffusely reflect visible light passing through the sheet 1 and can cause the visible light to be incident on the sheet 1 again from a rear surface thereof. Consequently, the background plate 27 can reduce differences in luminance between a portion where the sheet 1 is backed with the light diffusing/reflecting part 28 and portions where the sheet 1 is backed with the specific wavelength low reflective parts 29.

Figure 5:
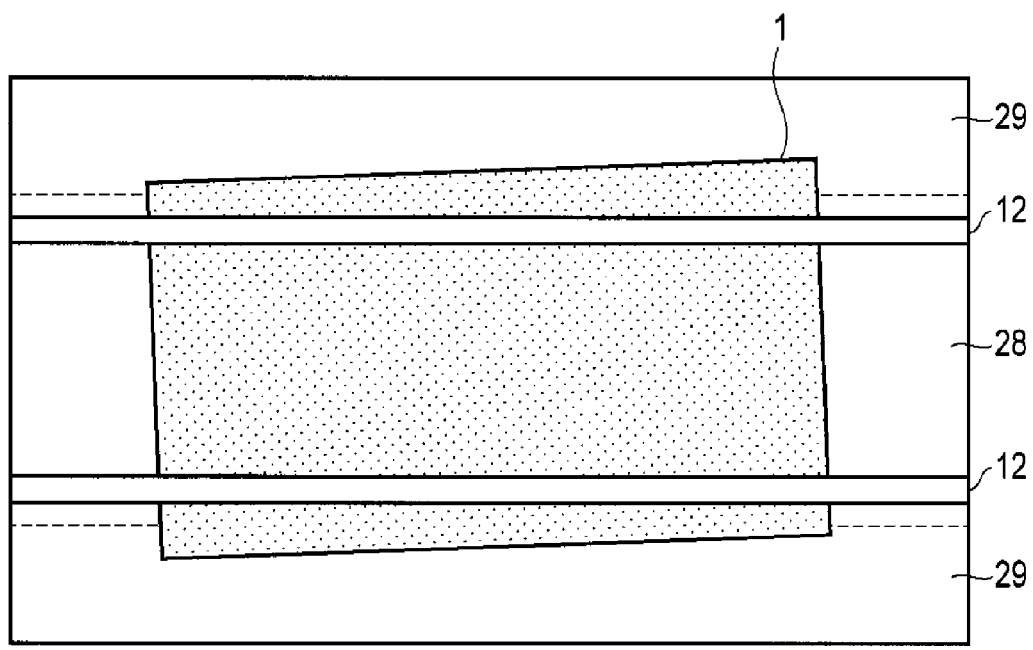
FIG. 5 is a plan view for explaining an image reading apparatus according to one embodiment.
Figure 6:
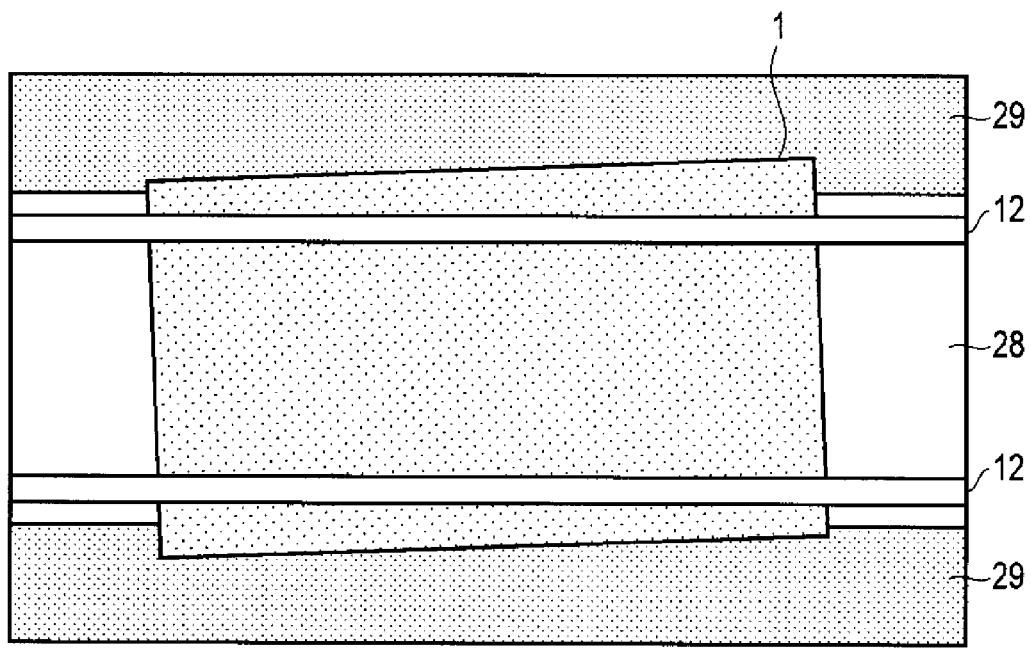
FIG. 6 is a plan view for explaining an image reading apparatus according to one embodiment.

FIGS. 5 and 6 each show an example of an image captured by the camera 23. FIG. 5 shows an example of a visible image captured by the camera 23. FIG. 6 shows an example of an IR image captured by the camera 23.

As shown in FIG. 5, the sheet 1 as well as the light diffusing/reflecting part 28 and the specific wavelength low reflective parts 29 of the background plate 27 are seen in the visible image. As described above, the light diffusing/reflecting part 28 and the specific wavelength low reflective parts 29 of the background plate 27 diffusely reflect visible light. Thus, in the visible image, there is no difference in luminance between the light diffusing/reflecting part 28 and the specific wavelength low reflective parts 29 of the background plate 27. Furthermore, there is no difference in luminance between a region of the sheet 1 that overlaps the light diffusing/reflecting part 28 and regions of the sheet 1 that overlap the respective specific wavelength low reflective parts 29. Consequently, the background plate 27 can function as a white plate in the visible light wavelength region so that the image of the sheet 1 is not affected by the regions of the light diffusing/reflecting part 28 and the specific wavelength low reflective parts 29.

As shown in FIG. 6, the sheet 1 as well as the light diffusing/reflecting part 28 and the specific wavelength low reflective parts 29 of the background plate 27 are seen in the IR image. It should be noted that the IR image shown in FIG. 6 and the visible light image shown in FIG. 5 are images captured at the same timing. As described above, the light diffusing/reflecting part 28 of the background plate 27 diffusely reflects infrared light, and the specific wavelength low reflective parts 29 absorb infrared light. Thus, in the infrared image, the light diffusing/reflecting part 28 of the background plate 27 is white, and the specific wavelength low reflective parts 29 are black.

Moreover, the sheet 1 diffusely reflects infrared light. Thus, in the infrared image, the sheet 1 is white (or a color close to white). As a result, in the IR image, there is a large difference in luminance between the sheet 1 and the specific wavelength low reflective parts 29. Therefore, the camera 23 can acquire an image for detecting edges of the sheet 1.

Figure 7:
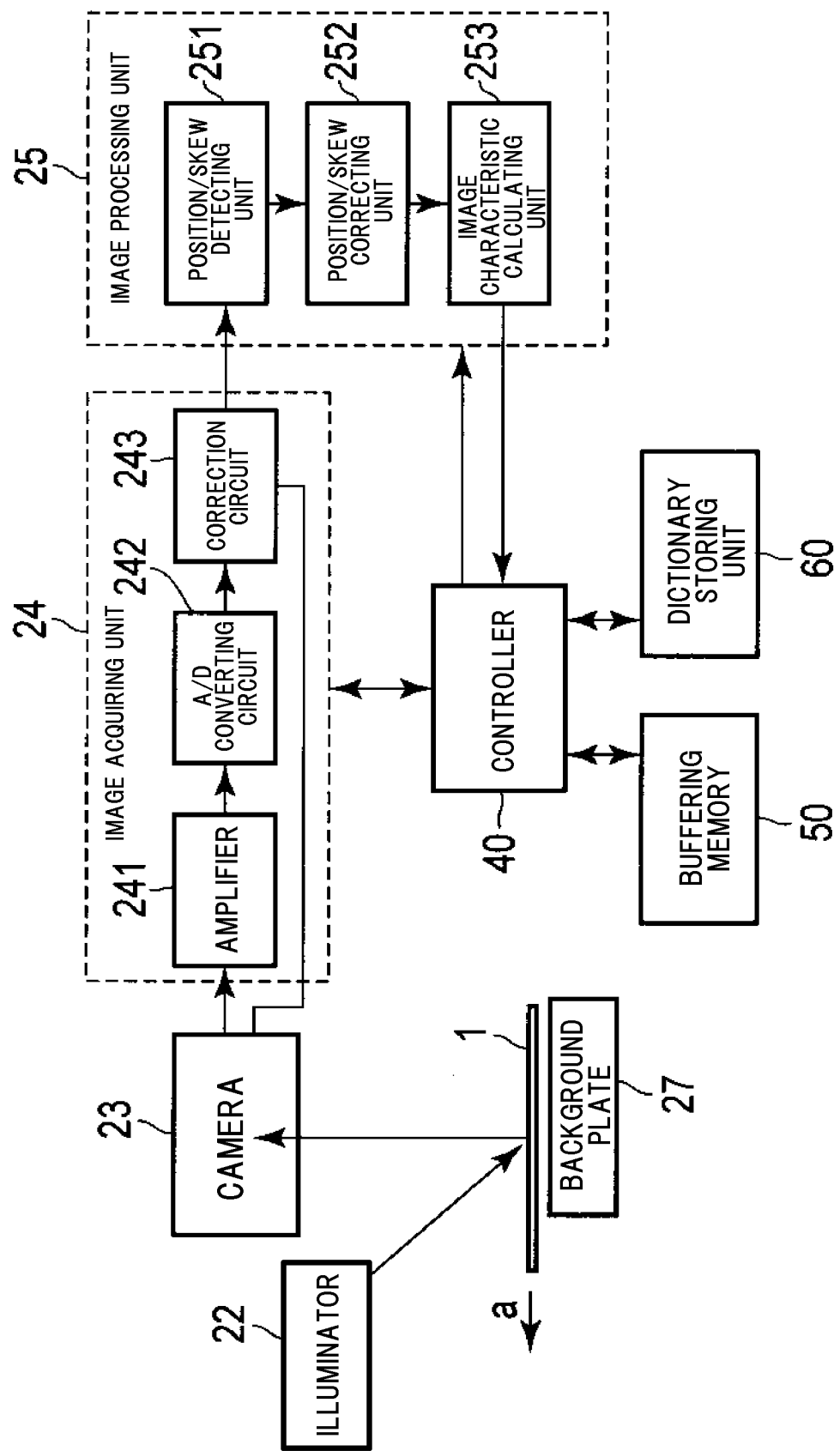
FIG. 7 is a block diagram for explaining an image reading apparatus according to one embodiment.

FIG. 7 shows an example of signal processing of the image reader 20. The image acquiring unit 24 includes an amplifier 241, an analog/digital converting circuit (A/D converting circuit) 242, and a correction circuit 243.

The amplifier 241 amplifies an input signal (image) from the camera 23 and outputs as an output signal. The A/D converting circuit 242 converts an analog signal, which is an input signal, into a digital signal and outputs as an output signal. The correction circuit 243 corrects an input signal for unevenness based on the properties of each imaging device of the camera 23 that are stored in advance. Also, the correction circuit 243 calculates an amplification factor of the amplifier 241 based on the brightness of those pixels of the image received from the camera 23 that correspond to the light diffusing/reflecting part 28 of the background plate 27 and a specified brightness value. That is to say, the correction circuit 243 performs the correction so as to set the brightness of the pixels of the image received from the camera 23 that correspond to the light diffusing/reflecting part 28 of the background plate 27 at the specified brightness value.

The image processing unit 25 includes a position/skew detecting unit 251, a position/skew correcting unit 252, and an image characteristic calculating unit 253.

The position/skew detecting unit 251 detects edges of the conveyed sheet 1 based on the IR image received from the image acquiring unit 24. Thus, the position/skew detecting unit 251 detects displacement (sliding amount) and skewing (amount of skew) of the sheet 1 during conveyance. It should be noted that the position/skew detecting unit 251 detects the edges of the sheet 1 based on the difference between the luminance of those regions of the IR image that correspond to the specific wavelength low reflective parts 29 and the luminance of the region that corresponds to the sheet 1.

The position/skew correcting unit 252 corrects the visible image and the IR image so that displacement and skewing of the sheet 1 that have been detected by the position/skew detecting unit 251 are eliminated. The position/skew correcting unit 252 extracts a region that corresponds to the sheet 1 from each of the visible image and the IR image based on the edges of the sheet 1 that have been detected by the position/skew detecting unit 251. The position/skew correcting unit 252 corrects the image of the sheet 1 that is extracted from each of the visible image and the IR image based on the sliding amount and the amount of skew that have been detected by the position/skew detecting unit 251. Thus, the position/skew correcting unit 252 can acquire a visible image of the sheet 1 and an IR image of the sheet 1 that are free from sliding and skewing.

The image characteristic calculating unit 253 calculates characteristics from each of the visible image of the sheet 1 and the IR image of the sheet 1. The image characteristic calculating unit 253 converts each of the visible image of the sheet 1 and the IR image of the sheet 1 into, for example, space vectors or other numerical values, thereby calculating the characteristics of each image. The image characteristic calculating unit 253 sends the calculated characteristics to the controller 40.

As described above, the controller 40 stores the characteristics supplied from the image reader 20 in the buffering memory 50. Moreover, the controller 40 reads out parameters, which serve as criteria, stored in the dictionary storing unit 60.

The controller 40 compares the parameters read out from the dictionary storing unit 60 with the characteristics stored in the buffering memory 50. Based on the comparison result, the controller 40 determines the denomination of the sheet 1, the authenticity of the sheet 1, the fitness of the sheet 1, and the like.

As described above, the image reader 20 includes the specific wavelength low reflective parts 29, which absorb light having a specific wavelength, and the light diffusing/reflecting part 28 in that region on the background plate 27 that corresponds to the imaging range of the camera 23. Furthermore, the specific wavelength low reflective parts 29 are respectively provided in areas that may overlap the corresponding side edge portions of the conveyed sheet 1. The background plate 27 is configured so that visible light is diffusely reflected from the entire background plate 27 and infrared light is not reflected from the specific wavelength low reflective parts 29. As a result, the image reader 20 can easily detect the edges of the sheet 1 using infrared light. Moreover, the image reader 20 can acquire a visible image of the sheet 1 that is less affected by the background plate 27.

Thus, the image reader 20 can more easily correct an image of the sheet 1 for skewing and can acquire a clearer image of the the sheet 1. Consequently, it is possible to provide an image reading apparatus and a sheet processing apparatus that read images with higher accuracy.

It should be noted that in the above-described embodiment, the camera 23 of the image reader 20 has been described as having a configuration in which light that is received by the spectral member 233 on a single optical axis is separated into light components in four different wavelength regions. However, the present invention is not limited to this configuration. The spectral member 233 may also be configured so as to separate light into a larger number of color components of light. In this case, the camera 23 of the image reader 20 includes the spectral member 233 that separates light entering on a single optical axis into those various color components and a plurality of line image sensors 232 corresponding to the respective color components.

Moreover, in the above-described embodiment, it has been described that the background plate 27 is configured to include the specific wavelength low reflective parts 29, which are provided in the respective end portions of the background plate 27 in the longitudinal direction, and the light diffusing/reflecting part 28, which is provided in the region of the surface of the background plate 27 excluding the specific wavelength low reflective parts 29. However, the present invention is not limited to this configuration. The specific wavelength low reflective parts 29 may also be provided throughout the background plate 27 rather than being provided only in the two end portions. In this case, the sheet 1 is backed uniformly, so that the image reader 20 can acquire a more uniform IR image of the sheet 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reading apparatus comprising:
   an illumination unit to irradiate a sheet that is conveyed by a conveyance unit with visible light and infrared light;
   an imaging unit to receive visible light and infrared light reflected from the sheet and to capture a visible image and an infrared image, the imaging unit including a first imaging portion to take the visible image and a second imaging portion to take the infrared image; and
   a background member including an infrared light low reflective part that is positioned within an imaging range of the imaging unit so as to overlap at least a side edge portion of the sheet and that diffusely reflects visible light and reflects infrared light at a lower reflectance than the sheet;
   an image processing unit to detect an edge of the sheet based on the captured infrared image and to correct the visible image based on the detected edge;
   an image characteristic calculating unit to calculate characteristics from each of the visible images taken by the first imaging portion and the infrared image taken by the second imaging unit; and
   an identification unit to identify the sheet by comparing the characteristics calculated by the image characteristic calculating unit with parameters read out from a dictionary storing unit, respectively,
   wherein the background member further includes:
   a light diffusing/reflecting member that is provided in a central portion in a direction orthogonal to a conveyance direction of the sheet and that diffusely reflects visible light and infrared light, and
   the image processing unit corrects the visible image based on visible light reflected from the light diffusing/reflecting member and corrects the infrared image based on infrared light reflected from the light diffusing/reflecting member.

2. The image reading apparatus according to claim 1, wherein the imaging unit includes:
   a visible light sensor to image visible light and to acquire a visible image;
   an infrared light sensor to image infrared light and to acquire an infrared image; and
   a spectral member to receive light on a single optical axis, to separate the received light into visible light and infrared light, to image the separated visible light onto the visible light sensor, and to image the separated infrared light onto the infrared light sensor.

3. The image reading apparatus according to claim 1, wherein the image processing unit detects an amount of skew or an amount of displacement of the sheet based on the detected edge, detects a sheet image in the visible image based on the detected edge, and corrects the sheet image for skewing or displacement based on the amount of skew or the amount of displacement.

4. A sheet processing apparatus comprising:
a conveyance unit to convey a sheet;
an illumination unit to irradiate the sheet that is conveyed by the conveyance unit with visible light and infrared light;
an imaging unit to receive visible light and infrared light reflected from the sheet and to capture a visible image and an infrared image, the imaging unit including a first imaging portion to take the visible image and a second imaging portion to take the infrared image;
a background member including an infrared light low reflective part that is positioned within an imaging range of the imaging unit so as to overlap at least a side edge portion of the sheet and that diffusely reflects visible light and reflects infrared light at a lower reflectance than the sheet;
an image processing unit to detect an edge of the sheet based on the captured infrared image and to correct the visible image based on the detected edge;
an image characteristic calculating unit to calculate characteristics from each of the visible image taken by the first imaging portion and the infrared image taken by the seconding imaging unit;
an identification unit to identify the sheet by comparing the characteristics calculated by the image characteristic calculating unit with parameters read out from a dictionary storing unit, respectively; and
a sorting processor to sort the sheet based on an identification result of the identification unit.

5. The sheet processing apparatus according to claim 4, wherein the imaging unit includes:
a visible light sensor to image visible light and to acquire a visible image;
an infrared light sensor to image infrared light and to acquire an infrared image; and
a spectral member to receive light on a single optical axis, to separate the received light into visible light and infrared light, to image the separated visible light onto the visible light sensor, and to image the separated infrared light onto the infrared light sensor.

6. The sheet processing apparatus according to claim 4, wherein the image processing unit detects an amount of skew or an amount of displacement of the sheet based on the detected edge, detects a sheet image in the visible image based on the detected edge, and corrects the sheet image for skewing or displacement based on the amount of skew or the amount of displacement.

* * * * *